Dec. 29, 1936.  M. LINDEM  2,066,010
STORAGE BATTERY AND CONNECTION THEREFOR
Filed April 8, 1935
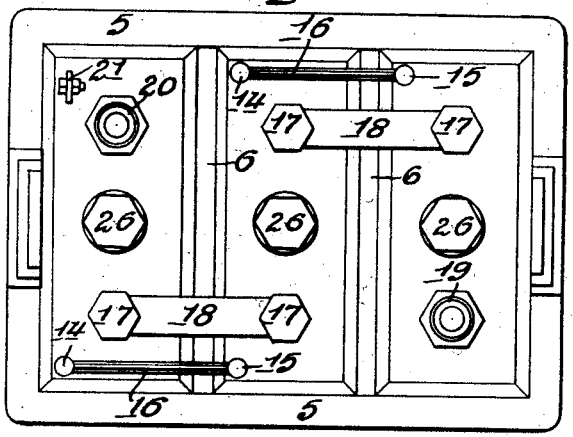
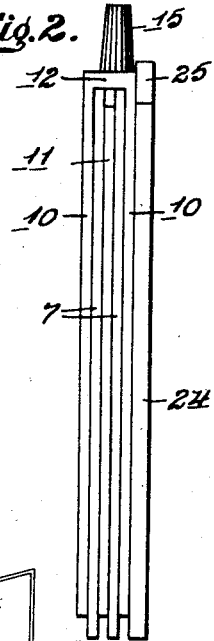
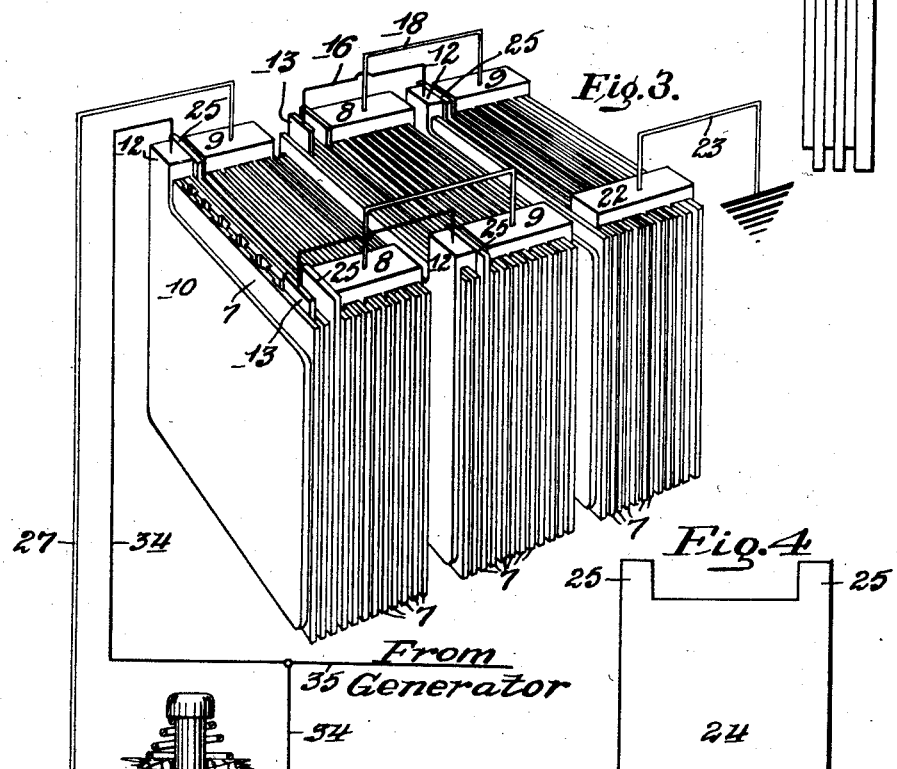
Inventor
Martin Lindem
By
Attorneys Patented Dec. 29, 1936

2,066,010

UNITED STATES PATENT OFFICE 2,066,010

STORAGE BATTERY AND CONNECTION THEREFOR

Martin Lindem, Rock Island, Ill., assignor to National Battery Company, St. Paul, Minn., a corporation of Delaware Application April 8, 1935, Serial No. 15,199

13 Claims. (Cl. 171—97)

The difficulties attendant upon the starting of motor vehicles in cold weather often result from a reduction of the battery voltages below those required for ignition during the interval when the current required to operate the starting mechanism is being drawn from the battery. The starters for most vehicles are operable with voltage as low as two and one-half to three volts, whereas, the ignition systems usually require, as a minimum, from four to five volts.

It is an object of this invention to improve the starting service afforded by a storage battery by providing a novel arrangement of distinct groups of plates adapted to maintain at all times an adequate voltage for the ignition system irrespective of any reduction in voltage that may take place in the starter circuit.

Another object of this invention is to provide a storage battery having the usual or a suitable number of separate cells, each containing a main and an auxiliary group of plates adapted to be connected in main and auxiliary circuits for special purposes, such as the maintenance of voltage in the ignition system of vehicles independently of the voltage of the starter circuit.

A further object is to provide a battery of this kind so constructed and arranged in circuits so that current may be withdrawn from the distinct groups of plates independently of each other but permitting the recharging of both groups simultaneously without damage to either.

The invention will be described by reference to the accompanying drawing in which;

Figure 1 is a plan view illustrating one form of my improved battery;

Fig. 2 is a diagrammatic end view of one of the smaller or auxiliary groups of plates and separators;

Fig. 3 is a diagrammatic illustration showing my novel arrangement of groups of plates and separators and their connections in the several cells of the battery and also showing the external circuits suitable for placing the battery in operation with an internal combustion engine, such as is in common use in motor vehicles, and Fig. 4 is a side elevation of the special separator between the groups of plates in each cell.

I provide a container 5 of common type formed with vertical partitions 6 dividing the battery into three separate cells. Each of these cells contains a body of electrolyte and a multiplicity of plates carrying the active material with the ordinary or suitable separators 7 between plates of opposite polarity. The plates in each cell are divided into two groups preferably comprising a large group, in which the plates of one polarity are connected by bars 8 and the plates of opposite polarity are connected by bars 9, and a smaller group comprising plates 10 and 11. The plates 10 have suitable lugs at their upper edges joined by a bar 12 and the single plate 11 has a lug 13 which is integral with a post 14. Secured to the bars 12 and projecting from the top of the battery are the posts 15 for inter-cell connections, the posts 14 and 15 being joined together by connectors 16. The external, inter-cell connections for the bars 8 and 9 are indicated in Fig. 1 as posts 17 and connectors 18 and battery terminal binding posts are indicated by the numerals 19, 20 and 21, the terminal 21 being integral with an end cell bar 12. Where one side of the circuit is to be grounded, the lug 13 of the small group of plates in the appropriate end cell is joined to a connecting bar 22 which also joints the several plates of the same polarity together in the larger group of this end cell. The binding post 19 is integral with the bar 22 and adapted to be grounded in the usual manner by a wire or cable 23 shown diagrammatically in Fig. 3.

To provide increased resistance to the electrolytic flux between the larger and smaller groups of plates in each cell, I provide a special separator 24 formed with projecting lugs 25, as shown in Fig. 4. These lugs 25 insulate the bars 8 from the lugs 13 at one end of each cell (except the end cell where the bar 22 is located) and also insulate the bars 9 from the bars 12 at the other end of each cell. The separators 24 have greater resistance to the electrolytic flux than the separators 7 and the former may be constructed from wood, rubber or a combination of wood and rubber, or from other suitable insulating material. The lugs 25 should project above the surface of the electrolyte to effectively insulate the connections for the larger and smaller groups of plates in the same cell. The battery illustrated has a suitable removable cap 26 for each cell to allow access to the electrolyte for filling and testing.

Circuit connections for motor vehicles having the common starter, ignition, charging and other facilities are shown diagrammatically in Fig. 3. These circuits include a wire or cable 27 extending from the binding post 20 to a starter switch 28 adapted when closed to place the battery in circuit with the starter motor through a wire 29, the return circuit being grounded to wire 23. For the ignition, a branch circuit wire 30 connects the wire 27 with a switch 31 which is normally closed and adapted to open the circuit to a wire 30 when the starter is operated, this circuit including wires 32 and 33 extending to the ignition mechanism of any of a number of types. A branch of the ignition circuit includes a wire 34 connected to the binding post 21 in such manner as to shunt the switch 31 and wires 30 and 32, and a wire 35 extending from the generator for charging both groups of plates simultaneously. Another branch circuit extending from the wire 27 for the lights, horn and other electric apparatus of the vehicle starts with a wire 36 in the main battery circuit, including the larger groups of plates in each cell.

In operation, when the starter switch 28 is operated to close the connection between the wires 27 and 29, current is drawn from the larger group of plates in each cell for the starter and from the smaller group for the ignition, current for the latter being conducted by the wires 34 and 33 from the terminal post 21. By this arrangement, continued use of the starter, or other large demand for current from the main groups of plates in the battery, does not affect the ignition voltage which is at all times maintained at an efficient value through the connections with the smaller groups of plates in the several cells of the battery. The switch 31 is opened during the starting operation to prevent reduction of the ignition voltage through a feed-back to the lower voltage circuits. At all times, except when starting, the switch 31 is closed so that the generator recharging takes place through the circuit wires 35 and 34 to the auxiliary groups of plates and through wires 35, 34, 32, 30 and 27 to the main groups of plates.

During charging of the battery I have found that overcharging of the auxiliary groups of plates is avoided because of the greater resistance of the smaller group of plates and special separator 24. I have also found that it is important to promote durability and a substantially uniformly long life of both groups of plates that the smaller group in each cell shall be immersed in the same body of electrolyte as the larger group and that the electrolyte shall be permitted to circulate or mix in each cell uniformly. In other words, it is important that the electrolyte in contact with the auxiliary group of plates shall be maintained at substantially the same specific gravity values as that in contact with the main group of plates in the same cell.

While I have described my invention in its particular application to a motor vehicle having starter, ignition and charging facilities, it will be understood that it has numerous other applications and uses within the scope of the appended claims.

Having described my invention, what I claim as new and desire to protect by Letters Patent is:

1. A storage battery having in combination, a plurality of separate cells each containing a body of electrolyte and each having a plurality of groups of plates carrying active material immersed in a common body of said electrolyte, means for connecting one group of said plates in each cell in circuit with a group of plates in each of the other cells and means for connecting another group of plates in each cell in another circuit.

2. A storage battery having in combination, a plurality of separate cells each containing a body of electrolyte and each having main and auxiliary groups of plates carrying active material immersed in a common body of said electrolyte, means connecting said main groups of said plates in a common circuit and means connecting said auxiliary groups of plates in another circuit.

3. A storage battery having in combination, a plurality of separate cells each containing a body of electrolyte and each having a plurality of groups of plates carrying active material immersed in a common body of said electrolyte, means connecting one group of said plates in each cell in series in a main circuit and means connecting another group of plates in each cell in series in a branch of said main circuit.

4. A storage battery having in combination, a plurality of separate cells each containing a body of electrolyte and each having a large and a relatively small group of plates carrying active material immersed in said electrolyte, means connecting the larger groups of plates in a common circuit and means connecting the smaller groups of plates in another circuit.

5. A storage battery having in combination, a plurality of separate cells each containing a body of electrolyte and each having a main and an auxiliary group of plates carrying active material immersed in said electrolyte, and a separator between said main and auxiliary groups of plates in each cell adapted to afford resistance to electrolytic flux between said groups in the same cell but permitting circulation of the electrolyte therein.

6. A storage battery having in combination, a plurality of separate cells each containing a body of electrolyte and each having a large and relatively small group of plates carrying active material immersed in the electrolyte therein, means connecting the larger groups of plates in a common circuit, means connecting the smaller groups of plates in another circuit and a separator between the smaller and larger groups of plates in each cell adapted to afford substantial resistance to electrolytic flux between groups in the same cell but permitting mixing of the electrolyte therein.

7. The combination with a storage battery having a plurality of separate cells each containing a body of electrolyte and each having a plurality of groups of plates carrying active material immersed in said electrolyte, of means for connecting one group of said plates in each cell in a main discharge circuit, means connecting another group of said plates in each cell in a branch discharge circuit and means for connecting both groups of plates in a common charging circuit.

8. The combination with a storage battery having a cell containing a body of electrolyte and having a plurality of groups of plates carrying active material immersed in said electrolyte, of a switch and wiring for connecting one group of said plates in a main discharge circuit, wiring connecting another group of said plates in a branch discharge circuit and a switch and wiring for connecting both groups of said plates in a common charging circuit.

9. The combination with starter, ignition and charging circuits of a motor vehicle, of a battery having a cell containing a body of electrolyte and a plurality of groups of plates carrying active material immersed in said electrolyte, means for connecting the plates of one group in said starter circuit, a branch circuit connecting another of said groups of plates in said ignition circuit and means for connecting said plates of both groups in said charging circuit.

10. A storage battery having in combination, a cell containing a body of electrolyte and having a plurality of groups of plates carrying active material immersed in a common body of said electrolyte, means for connecting one group of said plates in a main circuit and means connecting another group of said plates in another circuit.

11. A storage battery having in combination, a cell containing a body of electrolyte and having a plurality of groups of plates carrying active material immersed in said electrolyte, means for connecting one group of said plates in a main circuit, means connecting another group of said plates in another circuit and a separator insulating the connecting means for one group of plates from the connecting means for another group but permitting the mixing of the electrolyte throughout said cell.

12. A battery cell comprising a plurality of separate groups of plates carrying active material, each group containing plates of opposite polarity, a common body of electrolyte for said groups of plates and means connecting the plates of like polarity together in each group for separate circuit connections.

13. A battery cell comprising a main and an auxiliary group of plates carrying active material and all immersed in a common body of electrolyte, each of said groups comprising positive and negative plates, said auxiliary group comprising a single positive plate located between negative plates and means connecting the plates of like polarity in each group together for circuit connections.

MARTIN LINDEM.